United States Patent
Boissiere

(10) Patent No.: US 11,444,458 B2
(45) Date of Patent: Sep. 13, 2022

(54) DEVICE FOR SUPPLYING POWER TO AN ELECTRONIC COMPUTER

(71) Applicants: CONTINENTAL AUTOMOTIVE FRANCE, Toulouse (FR);
CONTINENTAL AUTOMOTIVE GmbH, Hannover (DE)

(72) Inventor: Philippe Boissiere, Cintegabelle (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 182 days.

(21) Appl. No.: 16/754,223

(22) PCT Filed: Oct. 8, 2018

(86) PCT No.: PCT/FR2018/052478
§ 371 (c)(1),
(2) Date: Apr. 7, 2020

(87) PCT Pub. No.: WO2019/073157
PCT Pub. Date: Apr. 18, 2019

(65) Prior Publication Data
US 2020/0274353 A1 Aug. 27, 2020

(30) Foreign Application Priority Data

Oct. 9, 2017 (FR) ...................................... 1759417

(51) Int. Cl.
*H02J 1/10* (2006.01)
*G06F 1/30* (2006.01)

(52) U.S. Cl.
CPC ................ *H02J 1/108* (2013.01); *G06F 1/30* (2013.01)

(58) Field of Classification Search
CPC ......... H02J 1/108; H02J 2310/46; G06F 1/30; B60R 16/03
See application file for complete search history.

(56) References Cited

U.S. PATENT DOCUMENTS 5,420,535 A * 5/1995 Nebuloni ................ H03F 1/305
330/51
6,137,275 A 10/2000 Ravon
(Continued)

FOREIGN PATENT DOCUMENTS

EP 0883051 A 12/1998
FR 2942555 A1 8/2010
(Continued)

OTHER PUBLICATIONS

International Search Report, dated Jan. 21, 2019, from corresponding PCT application No. PCT/FR2018/052478.

*Primary Examiner* — Chun Cao
(74) *Attorney, Agent, or Firm* — Nixon & Vanderhye

(57) ABSTRACT

Disclosed is a device for supplying power to an electronic computer having a first connection terminal coupled to a power supply, a second connection terminal coupled to an electrical ground, a microprocessor having a microprocessor supply input coupled, firstly, to a first terminal of first capacitance of a first capacitor and, secondly, coupled to a supply output of the power supply device, the second terminal of first capacitance being coupled to the electrical ground, the power supply device has a first supply input. It has a diode coupled to the supply input, and to the supply output, and a switching device coupled in parallel with the diode.

20 Claims, 2 Drawing Sheets

(56) References Cited

U.S. PATENT DOCUMENTS

| | | | |
|---|---|---|---|
| 6,326,775 B1* | 12/2001 | Wang | H02M 3/33576 |
| | | | 323/288 |
| 6,885,174 B2 | 4/2005 | Ravon | |
| 8,467,935 B2 | 6/2013 | Boissiere | |
| 2003/0128016 A1* | 7/2003 | Ravon | G05F 1/575 |
| | | | 323/282 |
| 2007/0077054 A1* | 4/2007 | Carnevale | G03B 15/14 |
| | | | 396/205 |
| 2010/0001581 A1 | 1/2010 | Broesse et al. | |
| 2010/0329065 A1* | 12/2010 | Johnston | G05F 1/46 |
| | | | 365/229 |
| 2011/0074473 A1* | 3/2011 | Yamada | H03K 17/22 |
| | | | 327/143 |
| 2012/0262139 A1* | 10/2012 | Moussaoui | H02M 1/44 |
| | | | 323/282 |
| 2014/0347904 A1* | 11/2014 | Kinoshita | H02M 7/066 |
| | | | 363/126 |
| 2017/0080883 A1* | 3/2017 | Yasunori | H02J 7/0063 |

FOREIGN PATENT DOCUMENTS

| KR | 20010016909 A | 3/2001 |
|---|---|---|
| WO | 2010094397 A1 | 8/2010 |

\* cited by examiner

DEVICE FOR SUPPLYING POWER TO AN ELECTRONIC COMPUTER

BACKGROUND OF THE INVENTION

The present invention pertains in a general manner to supplying power to an electronic device, such as, for example, an electronic computer.

The invention is applicable in particular in the automotive field. It may be implemented, for example, in an electronic engine control computer.

A motor vehicle nowadays contains an increasing amount of on-board electronics. Thus, in a motor vehicle, several electronic computers are used to ensure driver safety, air ventilation in the passenger compartment or the operation of the internal combustion engine.

An electronic computer has a relatively large number of passive electronic components (resistors, capacitors, inductors) or active electronic components (microprocessor/s, memories) coupled by means of electrical tracks arranged on and/or in a printed circuit.

The relatively large number of electronic computers, let alone power control functions, sometimes produce brownouts or electrical perturbations on the electrical supplies of said circuits. These electrical perturbations can cause temporary stoppage of the electronic computer or even sometimes bring about a reset on the electronic computer.

To make the electronic computer immune to these brownouts, capacitors serving to keep electrical energy are used. FIG. 1 shows a simplified diagram of an electronic computer 2 having such capacitors. Thus, the electronic computer 2 has at least one microprocessor 4 and a power module 6 adapted to control injectors, for example. The electronic computer 2 is coupled by connection means 8 to a power supply 10 denoted Vcc. The connection means 8 are a 128-pin connector, for example. The power supply 10 is a 12V battery of the motor vehicle, for example. Moreover, the electronic computer 2 is coupled by the connection means 8 to an electrical ground 12.

Electrical tracks are used and adapted to couple the microprocessor 4 and the power module 6 to the power supply 10. As mentioned above, to make the electronic computer 2, but more particularly the microprocessor 4, immune, a first capacitive structure C1, a second capacitive structure C2 and a diode D1 are used. The first capacitive structure C1 is coupled to the microprocessor 4 and is adapted to provide electrical energy stored within it in order to thwart a brownout.

To do this, a first terminal C1_1 of the first capacitive structure C1 is coupled to the electrical ground 12 and a second terminal C1_2 is coupled to an input 4_1 of the microprocessor 4, which input is dedicated to supplying power to said microprocessor. Moreover, the second terminal C1_2 is also coupled to a second terminal D1_2 of the diode D1. The second terminal D1_2 of the diode D1 is called the cathode. An anode called the first terminal D1_1 of the diode D1 is coupled to the connection means 8.

Moreover, the second capacitive structure C2 has a first terminal C2_1 coupled to the electrical ground 12 and a second terminal C2_2 coupled, firstly, to a supply input 6_1 of the power module 6 and secondly to the power supply 10 via the connection means 8. As a person skilled in the art is aware, the value of the first capacitive structure C1 is generally identical to that of the second capacitive structure C2.

Thus, in the event of a brownout on the power supply 10, the diode D1 turns off, electrically isolating the microprocessor 4 from the power module 6. Moreover, the electrical energy stored in the first capacitive structure C1 is delivered to the microcontroller 4. The main function of the second capacitive structure C2 is to filter the variations in the power supply 10. To provide these two functions (filtering and storing energy), the size of the two capacitive structures C1 and C2 is relatively large, for example 220 µF (farads), which can be awkward within the context of miniaturizing electronic computers.

SUMMARY OF THE INVENTION

The invention proposes a power supply device that provides a partial or full solution to the technical shortcomings of the cited prior art.

To this end, a first aspect of the invention proposes a device for supplying power to an electronic computer having connection means coupled to a power supply and to an electrical ground, a microprocessor having a microprocessor supply input coupled, firstly, to a first terminal of first capacitance of a first capacitor and, secondly, coupled to a supply output of the power supply device, the second terminal of first capacitance being coupled to the electrical ground, the power supply device moreover has a first supply input coupled, firstly, to the first connection terminal and, secondly, to a power module supply input of said power module.

According to the present invention, a diode having an anode is coupled to the supply input, and a cathode is coupled to the supply output, and a switching device is coupled in parallel with the diode allowing the microprocessor to be supplied with electrical energy in the event of a brownout on said power supply.

In one exemplary embodiment, the switching device is adapted to short the diode when a supply voltage delivered by the power supply is above a reference threshold value.

The switching device is adapted to be in an off state when said supply voltage is below the reference threshold value, for example.

As a variant, the capacitor is adapted to deliver sufficient electrical energy for the microprocessor to operate when the switching device shorts the diode.

Advantageously, to save using a capacitor on the electronic computer, said capacitor is adapted to filter the supply voltage delivered to the microprocessor and to the power module when the switching device is in the off state.

For the sake of improving the integration of the power supply device, the diode is, for example, an internal diode of a second transistor.

For example, the switching device has at least one first transistor with controlled switching.

A second aspect of the invention also proposes an electronic computer having at least one microprocessor and a power module with a power supply device according to the present invention.

BRIEF DESCRIPTION OF THE DRAWINGS

Other features and advantages of the invention will become more apparent upon reading the description that will follow. This description is purely illustrative and should be read with reference to the appended drawings, in which.

DETAILED DESCRIPTION OF THE PREFERRED EMBODIMENTS

Figure 1:
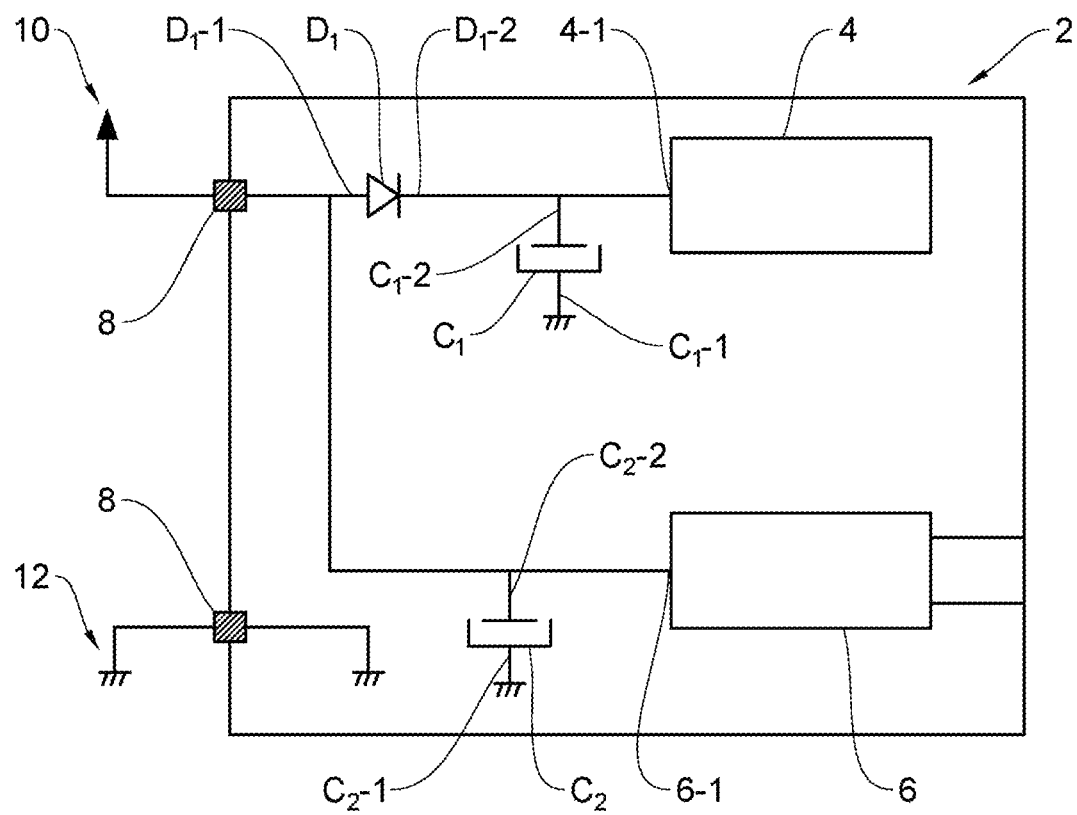
FIG. 1 is a circuit diagram of an electronic computer of the prior art.
Figure 2:
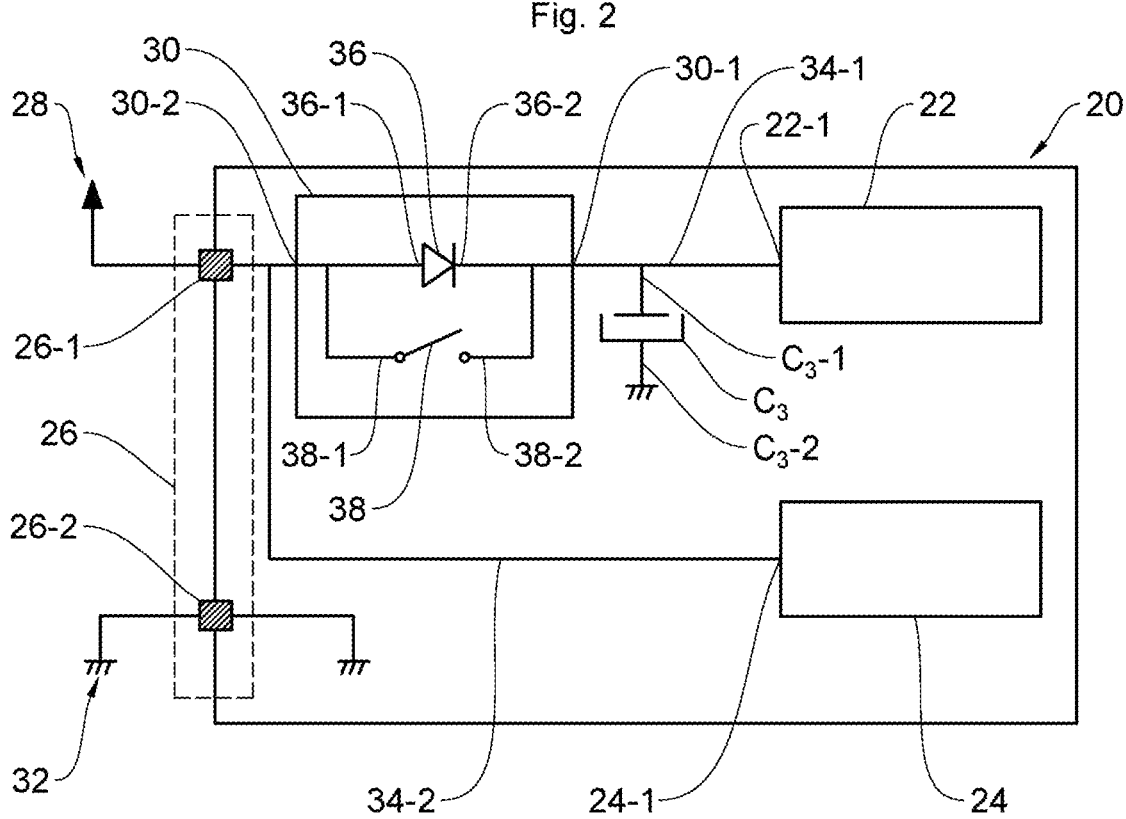
FIG. 2 is a schematic diagram of an electronic computer having a power supply device according to the present invention.

FIG. 2 shows a simplified schematic view of an electronic computer 20 having among other things a power supply device 30 according to the present invention. The electronic computer 20 has a microprocessor 22, a power module 24, connection means 26 and a first capacitor C3, for example.

The connection means 26 are a 256-pin connector, for example. In the example of FIG. 2, the connection means 26 have a first connection terminal 26_1 and a second connection terminal 26_2, the other pins not being shown in the figures as they are not useful for understanding the invention.

In one exemplary embodiment, the first connection terminal 26_1 is coupled to a power supply 28. The power supply 28 is a 12V battery, for example. The second connection terminal 26_2 is coupled to an electrical ground 32. The electrical ground 32 can be the body of the motor vehicle.

The microprocessor 22 has among other things a microprocessor supply input 22_1 coupled, firstly, via a first electrical track 34_1, to a power supply device supply output 30_1 and, secondly, to a first terminal of first capacitance C3_1 of the first capacitor C3. The first capacitor C3 also has a second terminal C3_2 coupled to the electrical ground 32.

Cleverly, the first capacitor C3 is adapted to, firstly, provide electrical energy to the microprocessor 22 in the event of a brownout on the power supply 28, and, secondly, filter potential oscillations in said power supply 28 at the power module 24. For example, the first capacitor C3 has a value of 220 µF.

The power supply device 30 also has a power supply device supply input 30_2 adapted to be coupled, firstly, to the first connection terminal 26_1 and, secondly, to a power module supply input 24_1 via a second electrical track 34_2.

The electrical tracks 34_1, 34_2 are for example made of copper and are arranged on and/or in a printed circuit of the electronic computer 20. The microprocessor 22 and the power module 24 will not be presented in more detail here because they are well known to a person skilled in the art.

Advantageously, the power supply device 30 is adapted to allow the microprocessor 22 to be supplied with electrical energy, stored in the first capacitor C3, in the event of a brownout on the power supply 28. To do this, in one exemplary embodiment, the power supply device 30 has a diode 36 and a switching device 38 coupled in parallel with said diode 36.

The diode 36 has an anode 36_1 coupled to the supply input 30_2, and a cathode 36_2 coupled to the supply output 30_1. The switching device 38 has a switching input 38_1 coupled to the supply input 30_2 and a supply output 38_2 coupled to the supply output 30_1.

The switching device 38 is adapted to be in an off state, corresponding to an open circuit, as illustrated in FIG. 2, when the supply voltage 28 has a value lower than a first threshold value V_ref_1. Moreover, the switching device 38 is adapted to be in an on state, that is to say to short the diode 36, when the supply voltage 28 has a value higher than the first threshold value V_ref_1.

Thus, for example if the first threshold value V_ref_1 is equal to 8V and the supply voltage 28 has a value of 12V, then the switching device 38 is in an on state, shorting the diode 36, which allows, firstly, the first capacitor C3 to charge (if it were not fully charged) and, secondly, allows the variations in the amplitude of the supply voltage 28 at the first supply input 24_1 to be filtered.

If the supply voltage 28 has a value less than, the first threshold value V_ref_1 of 8V, then the switching device 38 is in an off state, which allows the diode 36 to turn off and therefore isolate the first capacitor C3 and the microcontroller 22 from the power supply 28. In this case, the energy stored in the first capacitor C3 is delivered to the microprocessor 22, which allows the activity of said microprocessor 22 to be maintained for a determined period irrespective of the brownout on the power supply 28.

Thus, owing to the invention, it is possible to maintain the activity of the microprocessor 28 during a brownout on the power supply 28 while filtering the power supply 28 for certain oscillations using a single implemented capacitor.

Figure 3:
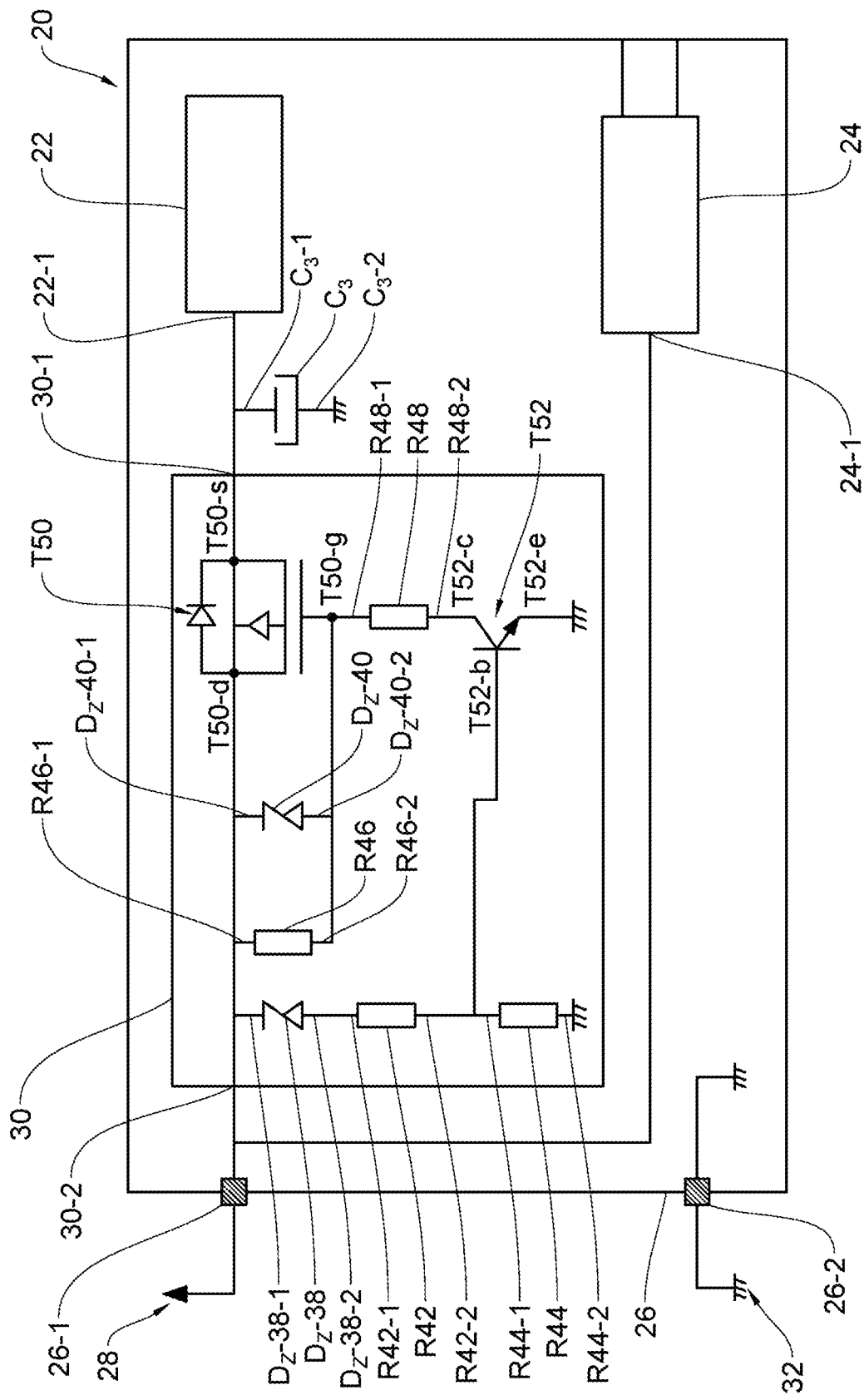
FIG. 3 is another embodiment of the invention.

FIG. 3 illustrates another embodiment of the power supply module 30. In this embodiment, the power supply module 30 still has the power supply device supply output 30_1 and the power supply device supply input 30_2. It moreover has a first Zener diode DZ_38, a second Zener diode DZ_40, a first resistor R_42, a second resistor R_44, a third resistor R_46, a fourth resistor R_48, a first transistor T_50 and finally a second transistor T_52.

The first Zener diode Dz_38 has a first Zener diode pin Dz_38_1 and a second first Zener diode pin Dz_38_2. The second Zener diode Dz_40 has a first second Zener diode pin Dz_40_1 and a second Zener diode pin Dz_40_2. The first resistor R_42 has a first first resistor pin R_42_1 and a second first resistor pin R_42_2. The second resistor R_44 has a first second resistor pin R_44_1 and a second second resistor pin R_44_2. The third resistor R_46 has a first third resistor pin R_46_1 and a second third resistor pin R_46_2. The fourth resistor R_48 has a first fourth resistor pin R_48_1 and a second fourth resistor pin R_48_2. The first transistor T_50 has a drain T_50_d, a source T_50_s and a gate T_50_g. Finally, the second transistor T_52 has a base T_52_b, a collector T_52_c and an emitter T_52_e.

As illustrated in FIG. 3, the first first Zener diode pin Dz_38_1, the first third resistor pin R_46_1, the first second Zener diode pin Dz_40_1 and the drain T_50_d are coupled to the supply input of the power supply device 30_2. The second first Zener diode pin Dz_38_2 is coupled to the first first resistor pin R_42_1; the second first resistor pin R_42_2 is coupled to the base T_52_b and to the first second resistor pin R_44_1. The second second resistor pin R_44_2 is coupled to the electrical ground, the emitter T_52_e also being coupled to the electrical ground 32. The collector T_52_c is coupled to the second fourth resistor pin R_48_2 and the first fourth resistor pin R_48_1 is coupled to the gate T_50_g, to the second second Zener diode pin Dz_40_2 and to the second third resistor pin R_46_2. Finally, the source T_50_s is coupled to the supply output of the power supply device 30_1.

Thus, in this exemplary embodiment illustrated in FIG. 3, the first threshold value V_ref_1 is determined by what is known as a "Zener voltage" threshold voltage of the first Zener diode Dz_38. When the value of the supply voltage 18 is higher than the first threshold value V_ref_1, the first Zener diode Dz_38 turns on allowing an increase in the potential on the base T_52_b. When the potential on the base T_52_b is sufficient, the second transistor T_52 is saturated. In this case, a divider bridge created by the fourth resistor R_48 and the third resistor R_46 allows a negative voltage Vgs corresponding to the voltage present between the gate T_52_g and the source T_52_s of the second transistor T_52 to be obtained. In this case, as the first transistor T_50 is a P-type MOS transistor, the latter turns on, which allows the supply voltage 24 to be applied to the first capacitor C3.

If the supply voltage 28 is lower than the threshold voltage V_ref_1, the first Zener diode Dz_38 is no longer on, forcing the potential on the base T_52_b to 0 V. In this case, the second transistor T_52 is not on, thereby forcing the first transistor T_50 into an off state, that is to say that the voltage Vgs is equal to 0V. In this case, the first transistor T_50 is off, isolating the microprocessor 22 and the first capacitor C3 from the rest of the electronic computer 20.

Advantageously, owing to the invention, it is possible to protect the microprocessor from voltage drop/s or voltage spike/s. Moreover, it is possible, owing to the invention, to obtain filtering of the supply voltage both on the microprocessor and on the power supply unit by using a single capacitor. In this way, it is possible to reduce the printed circuit surface area of the electronic computer by saving at least one capacitor as compared with the prior art.

Of course, the present invention is not limited to the preferred embodiment described above and illustrated in the drawing and to the variant embodiments mentioned, but extends to all variants within the competence of those skilled in the art.

The invention claimed is:

1. A power supply device (30) for supplying power to an electronic computer that includes a microprocessor and connection means (26) the connection means (26) coupled to a power supply and to an electrical ground (32), the microprocessor (22) having a microprocessor supply input (22_1) coupled to a first terminal (C3_1) of a first capacitor (C3), and a second terminal (C3_2) of the first capacitor (C3) being coupled to the electrical ground (32), the power supply device (30) comprising:
a supply device output (30_1) coupled to the microprocessor supply input (22_1) and the first terminal (C3_1) of the first capacitor (C3);
a supply device input (30_2) coupled to a first connection terminal (26_1) of the connection means (26) and also to a supply input (24_1) of a power module (24); and
a diode (36), having an anode (36_1) coupled to the supply device input (30_2), and a cathode (36_2) coupled to the supply device output (30_1),
wherein a switching device (38) is coupled to the anode (36_1) of the diode (36) and the cathode (36_2) of the diode (36), so as to be in parallel with the diode (36).

2. The power supply device (30) as claimed in claim 1, wherein the switching device (38) is adapted to short the diode (36) when the power supply has a voltage value above a reference threshold value (V_ref_1).

3. The power supply device (30) as claimed in claim 1, wherein the switching device (38) is adapted to be in an off state when the power supply has a voltage value below the reference threshold value (V_ref_1).

4. The power supply device (30) as claimed in claim 2, wherein the first capacitor (C3) is adapted to deliver sufficient electrical energy for the microprocessor (22) to operate when the switching device (38) shorts the diode (36).

5. The power supply device (30) as claimed in claim 1, wherein the first capacitor (C3) is adapted to filter a supply voltage provided by the power supply when the switching device (38) is in an off state.

6. The power supply device (30) as claimed in claim 1, wherein the diode (36) is an internal diode of a second transistor (T_52).

7. The power supply device (30) as claimed in claim 1, wherein the switching device (38) has at least one first transistor (T_50) with controlled switching.

8. An electronic computer (2), having at least one microprocessor (22), a power module (24), and a power supply device (30) as claimed in claim 1.

9. The power supply device (30) as claimed in claim 2, wherein the switching device (38) is adapted to be in an off state when the power supply has a voltage value below the reference threshold value (V_ref_1).

10. The power supply device (30) as claimed in claim 3, wherein the first capacitor (C3) is adapted to deliver sufficient electrical energy for the microprocessor (22) to operate when the switching device (38) shorts the diode (36).

11. The power supply device (30) as claimed in claim 2, wherein the first capacitor (C3) is adapted to filter the supply voltage when the switching device (38) is in an off state.

12. The power supply device (30) as claimed in claim 3, wherein the first capacitor (C3) is adapted to filter the supply voltage when the switching device (38) is in the off state.

13. The power supply device (30) as claimed in claim 4, wherein the first capacitor (C3) is adapted to filter the supply voltage when the switching device (38) is in an off state.

14. The power supply device (30) as claimed in claim 2, wherein the diode (36) is an internal diode of a second transistor (T_52).

15. The power supply device (30) as claimed in claim 3, wherein the diode (36) is an internal diode of a second transistor (T_52).

16. The power supply device (30) as claimed in claim 4, wherein the diode (36) is an internal diode of a second transistor (T_52).

17. The power supply device (30) as claimed in claim 2, wherein the switching device (38) has at least one first transistor (T_50) with controlled switching.

18. The power supply device (30) as claimed in claim 3, wherein the switching device (38) has at least one first transistor (T_50) with controlled switching.

19. The power supply device (30) as claimed in claim 1, further comprising:
a first Zener diode (DZ_38);
a second Zener diode (DZ_40);
a first resistor (R_42);
a second resistor (R_44);
a third resistor (R_46);
a fourth resistor (R_48);
a first transistor (T_50); and
a second transistor (T_52),
wherein the first Zener diode (Dz_38), the first resistor (R_46), the first Zener diode (Dz_40), and a drain of the first transistor (T_50) are coupled to the supply device input (30_2), the second Zener diode (Dz_38) is coupled to a first pin of the first resistor (R_42), a second pin of the first resistor (R_42) is coupled to a base of the second transistor (T_52) and to a first pin of the second resistor (R_44), a second pin of the second resistor (R_44) is coupled to the electrical ground, an emitter of the second transistor (T_52) is coupled to the electrical ground, a collector of the second transistor (T_52) is coupled to a second pin of the fourth resistor (R_48), a first pin of the first resistor (R_48) is coupled to a gate of the first transistor (T_50), to the second Zener diode (Dz_40), and to a pin of the third resistor (R_46), and a source of the first transistor (T_50) is coupled to the supply device output (30_1).

20. An electronic engine control computer for controlling an engine, comprising:
a microprocessor (22), which includes a microprocessor supply input (22_1);

a power module (24) adapted to control injectors of the engine;

connection means (26) that couples to a supply of electrical energy and to an electrical ground (32);

a first capacitor (C3) with first and second terminals, the first terminal (C3_1) of the first capacitor (C3) coupled to the microprocessor supply input (22_1), and the second terminal (C3_2) of the first capacitor (C3) being coupled to the electrical ground (32); and a power supply device (30), which includes a diode (36), a switching device (38), a supply device output (30_1) coupled to the microprocessor supply input (22_1), and a supply device input (30_2) coupled to both a first connection terminal (26_1) of the connection means (26) and also to a supply input (24_1) of the power module (24), the diode (36) having an anode (36_1) coupled to the supply device input (30_2), and a cathode (36_2) coupled to the supply device output (30_1), and the switching device (38) being coupled to the anode (36_1) and the cathode (36_2) of the diode (36) so as to be in parallel with the diode (36).

\* \* \* \* \*